(12) United States Patent
Teramae et al.

(10) Patent No.: US 10,486,347 B2
(45) Date of Patent: Nov. 26, 2019

(54) METHOD OF MANUFACTURING ELECTROMAGNETIC WAVE SHIELD HOUSING

(71) Applicants: TOYOTA JIDOSHA KABUSHIKI KAISHA, Toyota-shi, Aichi-ken (JP); Nissha Printing Co., Ltd., Kyoto-shi, Kyoto (JP)

(72) Inventors: Takanori Teramae, Kumano (JP); Kiyonori Ono, Itami (JP); Shigetaka Yoshikawa, Miyoshi (JP)

(73) Assignees: Toyota Jidosha Kabushiki Kaisha, Toyota-shi, Aichi-ken (JP); Nissha Printing Co., Ltd., Kyoto-shi, Kyoto (JP)

( * ) Notice: Subject to any disclaimer, the term of this patent is extended or adjusted under 35 U.S.C. 154(b) by 399 days.

(21) Appl. No.: 14/925,173

(22) Filed: Oct. 28, 2015

(65) Prior Publication Data
US 2016/0136858 A1    May 19, 2016

(30) Foreign Application Priority Data
Nov. 14, 2014    (JP) .................................. 2014-231196

(51) Int. Cl.
*B29C 45/14*    (2006.01)
*B29L 31/34*    (2006.01)
(Continued)

(52) U.S. Cl.
CPC .... *B29C 45/14639* (2013.01); *B29K 2101/12* (2013.01); *B29K 2705/00* (2013.01);
(Continued)

(58) Field of Classification Search
CPC ............ B29K 2705/00; B29K 2705/02; B29K 2995/0011; B29K 2715/006;
(Continued)

(56) References Cited

U.S. PATENT DOCUMENTS

2002/0180108 A1    12/2002  Koshiba
2007/0071929 A1*    3/2007  Haimoff .............. B29C 37/0085
                                                                428/36.91
(Continued)

FOREIGN PATENT DOCUMENTS

JP    S59-56797 U1    4/1984
JP    S63-240100 A    10/1988
(Continued)

*Primary Examiner* — Jeffrey M Wollschlager
*Assistant Examiner* — Armand Melendez
(74) *Attorney, Agent, or Firm* — Finnegan, Henderson, Farabow, Garrett & Dunner, LLP

(57) ABSTRACT

A method of manufacturing an electromagnetic wave shield housing that accommodates an electronic component and shields the electronic component from electromagnetic waves is provided, which includes: placing a resin plate inside a shielding metal plate, the shielding metal plate including a plate central area of the metal plate having a shielding property against the electromagnetic waves, and plate outer peripheral edges that are formed around the plate central area and stand up from the plate central area in standing postures, the resin plate including a central portion that overlaps with the plate central area, and stand-up portions that stand up from the central portion so as to conform to the standing postures and overlap with the plate outer peripheral edges, respectively; and injecting resin to the shielding metal plate, where the resin plate is placed, from outside the shielding metal plate to cover the shielding metal plate with the injected resin from outside. Thus, the electromagnetic wave shield housing can easily be manufactured, without causing any changes to the postures of the plate outer peripheral edges of the shielding metal plate and impeding the weight reduction.

8 Claims, 5 Drawing Sheets

(51) Int. Cl.
 *B29K 101/12* (2006.01)
 *B29K 705/00* (2006.01)
(52) U.S. Cl.
 CPC ............... *B29K 2995/0011* (2013.01); *B29L 2031/3481* (2013.01)
(58) Field of Classification Search
 CPC ...... B29K 2995/002; B29K 2995/0026; B29K 2995/0087; B29K 2055/02; B29K 2067/00; B29K 2069/00; B29K 2079/08; B29K 2101/12; B29K 2711/00; B29K 2705/0026; B29C 45/14639; B29C 45/1418; B29C 45/14311; B29C 45/14778; B29C 45/14811; B29C 45/14467; B29C 45/0046; B29C 45/14065; B29C 45/14344; B29C 45/144; B29C 2045/14967; B29C 2045/0049; B29C 2045/14532; B29C 51/10; B29C 2045/14114; B29C 2045/14188; B29C 2045/14213; B29C 2045/14237; B29C 2045/14303; B29C 2045/14327; B29C 2045/14852; B29C 2045/14983; B29C 2791/001; B29C 2791/006; B29C 33/14; B29C 37/0078; B29C 37/0085; B29C 43/18; B29C 45/0005; B29C 45/14221; B29C 45/14786; B29C 45/14819; B29C 45/16; B29L 2031/3481
 See application file for complete search history.

(56) References Cited

U.S. PATENT DOCUMENTS

| | | | |
|---|---|---|---|
| 2012/0148892 A1* | 6/2012 | Hoecker | B29C 45/14467 429/99 |
| 2015/0017393 A1* | 1/2015 | Oh | G02F 1/133308 428/177 |

FOREIGN PATENT DOCUMENTS

| | | |
|---|---|---|
| JP | S64-28998 A | 1/1989 |
| JP | 2003-170531 | 6/2003 |
| JP | 2011-207123 A | 10/2011 |
| JP | 2012-45920 | 3/2012 |
| JP | 2013-55298 | 3/2013 |
| TW | 2011-16396 A1 | 5/2011 |

* cited by examiner

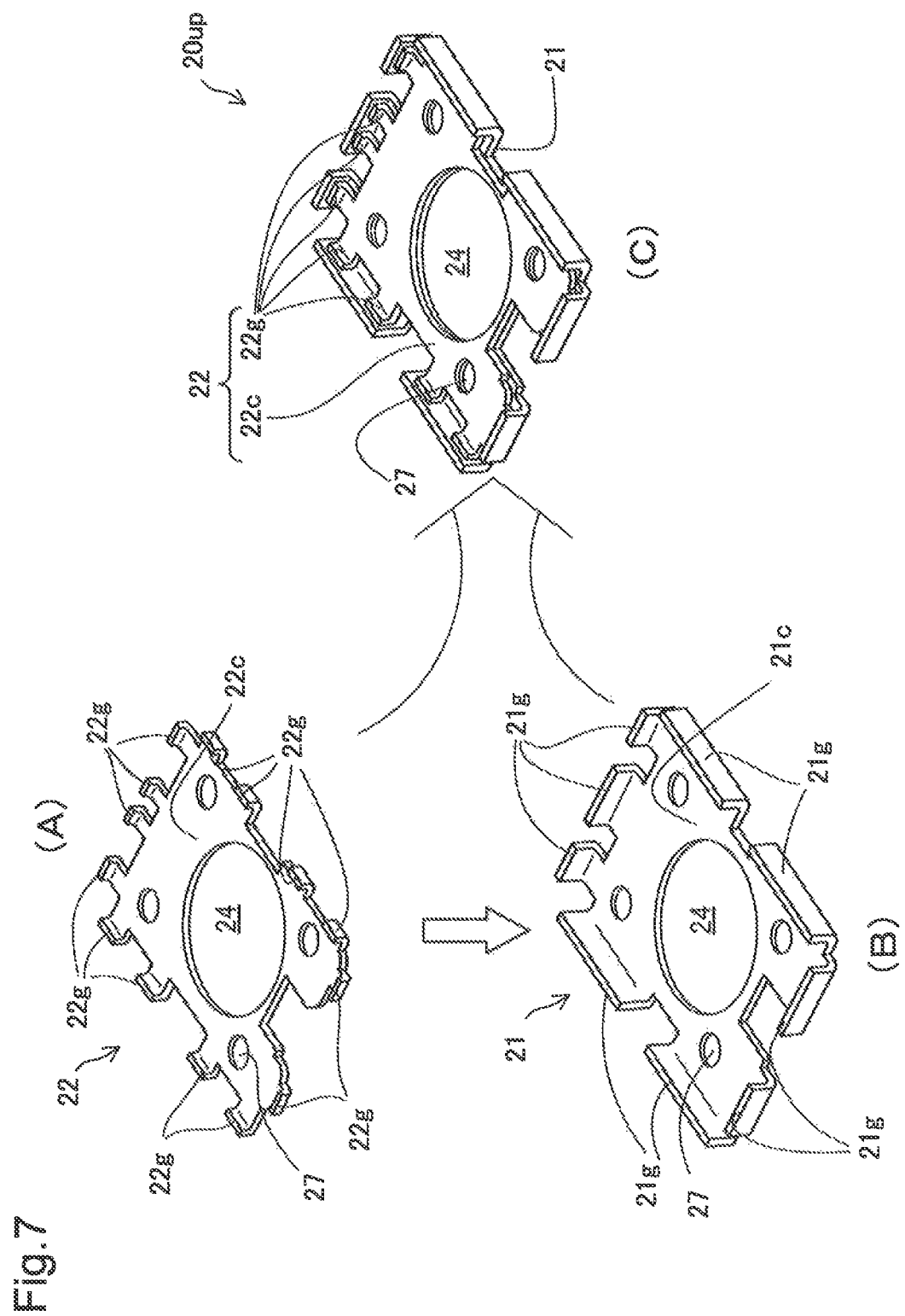

METHOD OF MANUFACTURING ELECTROMAGNETIC WAVE SHIELD HOUSING

CROSS-REFERENCE TO RELATED APPLICATION

The present application claims priority from Japanese application P2014-231196 filed on Nov. 14, 2014, the content of which is hereby incorporated by reference into this application.

BACKGROUND

Field

The present invention relates to a method of manufacturing an electromagnetic wave shield housing.

Related Art

The electromagnetic wave shield housings are frequently used in various fields to shield electronic components accommodated therein from electromagnetic waves. An electromagnetic shield is made of various kinds of metal plate which have a shielding property against electromagnetic waves. For example, JP2013-55298A proposes an electromagnetic wave shield cover which is formed by injection molding in which a metal plate for a shield, which has a thin plate shape of which outer edge is bent, is covered by resin from outside in order to reduce the weight.

However, when injection molding such an electromagnetic wave shield housing, the thin-plate-shaped metal plate is deformed. The deformation of the plate happens because the shielding metal plate receives a pressure resulting from a flow of resin when injecting the resin (hereinafter, referred to as "the resin flow pressure"). This resin flow pressure acts on each part of the shielding metal plate from outside when injecting the resin from outside the shielding metal plate. Thus, a plate outer edge which is the bent portion of the shielding metal plate may be further bent inwardly when receiving the resin flow pressure from outside, and thereby the original posture of the plate outer edge may change. The further bending of the plate outer edge can be avoided if the shielding metal plate is made thicker; however, the weight reduction effects will be lost. Therefore, a method of manufacturing an electromagnetic wave shield housing came to be demanded, which does not cause the change in the posture of the plate outer edge of the shielding metal plate, while achieving the weight reduction.

SUMMARY

The present invention may be implemented in terms of the following aspects in order to address at least a part of the subjects described above.

(1) According to one aspect of the invention, a method of manufacturing an electromagnetic wave shield housing that accommodates an electronic component and shields the electronic component from electromagnetic waves is provided. The method may include: placing a resin plate inside a shielding metal plate, the shielding metal plate including a plate central area of the metal plate having a shielding property against the electromagnetic waves, and plate outer peripheral edges that are formed around the plate central area and stand up from the plate central area in standing postures, the resin plate including a central portion that overlaps with the plate central area, and stand-up portions that stand up from the central portion so as to conform to the standing postures and overlap with the plate outer peripheral edges, respectively; and injecting resin to the shielding metal plate, where the resin plate is placed, from outside the shielding metal plate to cover the shielding metal plate with the injected resin from outside.

In the method of manufacturing the electromagnetic wave shield housing of the aspect described above, during a resin injection, a resin flow pressure resulting from a flow of the injected resin acts, from outside, on the plate central area of the shielding metal plate, as well as on the plate outer peripheral edges which stand up from the plate central area. Since the stand-up portions of the resin plate attached to the inside of the plate overlap with the plate outer peripheral edges, the stand-up portions of the resin plate resist from inside the plate against the resin flow pressure which acts from outside the plate. Therefore, even when the plate outer peripheral edges which stand up from the plate central area receive the resin flow pressure from outside, the plate outer peripheral edges can maintain their standing postures before the resin injection. Moreover, such a preservation of the standing postures of the plate outer peripheral edges is achieved by the resin plate attached inside the plate, without increasing the thickness of the shielding metal plate. As a result, according to the method of manufacturing the electromagnetic wave shield housing of the aspect described above, change of the postures of the plate outer peripheral edges of the shielding metal plate can be reduced. In addition, since the thickness of the metal plate is not increased, the weight reduction is not impeded. Further, since the resin plate is only provided inside the shielding metal plate before the resin injection, according to the method of manufacturing the electromagnetic wave shield housing of the aspect described above, the lightweight electromagnetic wave shield housing which does not cause any changes to the postures of the plate outer peripheral edges of the shielding metal plate can easily be manufactured.

The resin plate may be formed by injection molding using dies, the resin plate being formed inside the shielding metal plate of which the plate outer peripheral edges are stood up from the plate central area. Thus, the resin plate is not necessary to be adhered, and the process becomes simple.

The plate outer peripheral edges may be formed in the standing postures in which the plate outer peripheral edges are bent and stood up by substantially 90 degrees from the plate central area. Thus, the electromagnetic wave shield housing can easily be formed to have a rectangular shape.

Note that the present invention can be implemented in various forms such as the electromagnetic wave shield housing itself, and the resin plate that is a resin molded article used for manufacturing the electromagnetic wave shield housing.

BRIEF DESCRIPTION OF THE DRAWINGS

The present disclosure is illustrated by way of example and not by way of limitation in the figures of the accompanying drawings, in which the like reference numerals indicate like elements and in which:

FIG. 7 is a view illustrating a procedure of separately preparing a resin plate and manufacturing the pre-housing.

DETAILED DESCRIPTION OF EMBODIMENT

Figure 1:
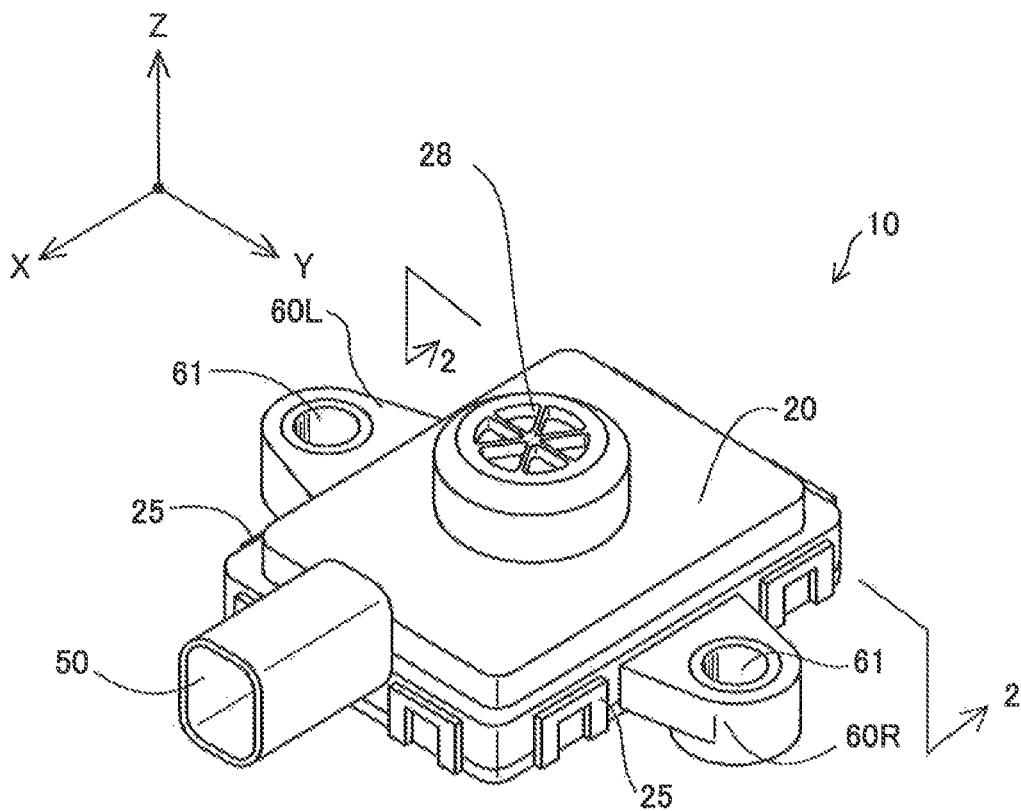
FIG. 1 is a perspective view schematically illustrating an electromagnetic wave shield housing as one embodiment of the present invention.
Figure 2:
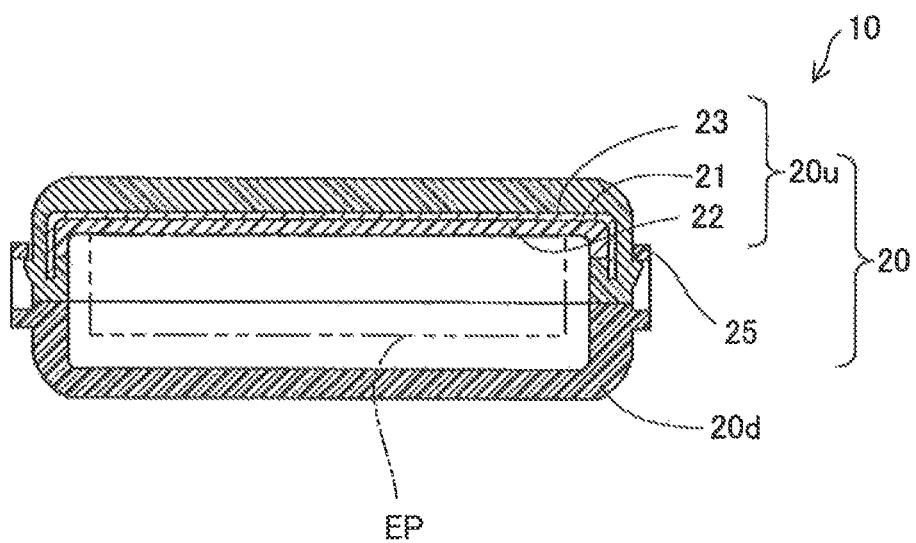
FIG. 2 is a cross-sectional view illustrating the electromagnetic wave shield housing, taken along a line 2-2 in FIG. 1.

Hereinafter, one embodiment of the present invention is described with reference to the accompanying drawings. FIG. 1 is a perspective view schematically illustrating an electromagnetic wave shield housing 10 manufactured by a manufacturing method which is one embodiment of the present invention, and FIG. 2 is a cross-sectional view illustrating the electromagnetic wave shield housing 10, taken along a line 2-2 in FIG. 1. In the following description, according to arrows X, Y and Z illustrated in FIG. 1, X-direction may be referred to as longitudinal directions, Y-direction may be referred to lateral directions, and Z-direction may be referred to as vertical directions of the electromagnetic wave shield housing 10. Further, X- and Y-directions may also be collectively referred to as horizontal directions.

As illustrated, the electromagnetic wave shield housing 10 includes a housing body 20, a connector holder 50, and mounting arms 60R and 60L. The housing body 20 has a substantially rectangular shape in a plan view seen from above and is hollow inside as illustrated in FIG. 2. The housing body 20 shields an electronic component EP, containing a central processing unit (CPU), a microprocessor (MPU), etc. accommodated therein, from electromagnetic waves. The electromagnetic wave shield housing 10 of this embodiment accommodates a hydrogen gas detector as the electronic component EP. A gas entry protruded portion 28 is formed in an upper surface of the housing body 20, and the hydrogen gas detector detects a concentration of hydrogen gas which entered into the housing body from the gas entry protruded portion 28.

The connector holder 50 is formed so as to project in X-direction from one end of the housing body 20, specifically one end of an upper housing 20u which will be described later in detail. The connector holder 50 holds terminals (illustration is omitted) of various cables for supplying electric power, and transmitting and receiving signals to/from the electronic component EP. The connector holder 50 connects connector terminals to the terminals by attaching a connector provided at an end of a cable (not illustrated). The mounting arms 60R and 60L are provided so as to project from side walls of the housing body 20 in the lateral directions (Y-directions), specifically, left and right side walls of the upper housing 20u which will be described later in detail, and are used for fixing the electromagnetic wave shield housing 10 by bolts (not illustrated) which are inserted into bolt bushes 61.

As illustrated in FIG. 2, the housing body 20 is formed by stacking the upper housing 20u which is downwardly concave over an under housing 20d which is upwardly concave so that the housings oppose their openings and, thus, the housing body 20 accommodates the electronic component EP therein. The upper housing 20u is formed by stacking a shielding metal plate 21, a resin plate 22, and a resin surface portion 23. The shielding metal plate 21 is formed through a pressing of a plate made of metal, such as aluminum, iron, copper, tin, magnesium, lead, or zinc, which has a property of shielding from electromagnetic waves. The resin plate 22 is a molded article made of resin, such as acrylic resin or polyethylene resin, which is normally used in a field of the electromagnetic wave shield housing 10, and the shape thereof is conformed to the shielding metal plate 21, as will be described later. The resin surface portion 23 is formed by injecting the resin described above as will be described later, and covers from outside the shielding metal plate 21 as well as a plate outer edge perimeter. The under housing 20d is a molded article made of resin so that it is concaved. The under housing 20d is fixed to the upper housing 20u by lock pieces 25 which are respectively provided to four side walls.

Figure 3:
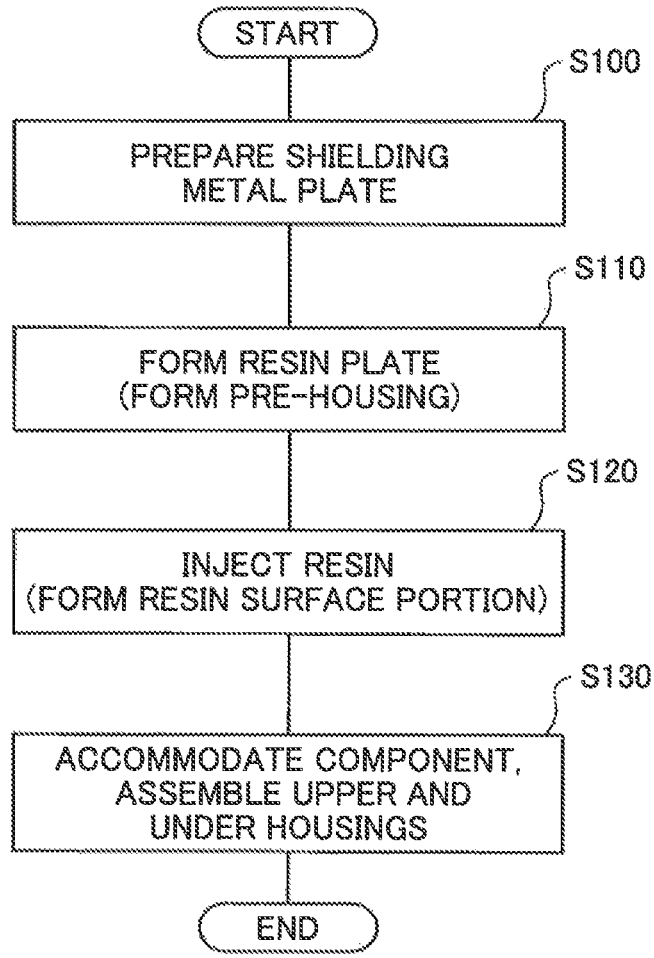
FIG. 3 is a process flowchart illustrating a manufacture procedure of the electromagnetic wave shield housing.
Figure 4:
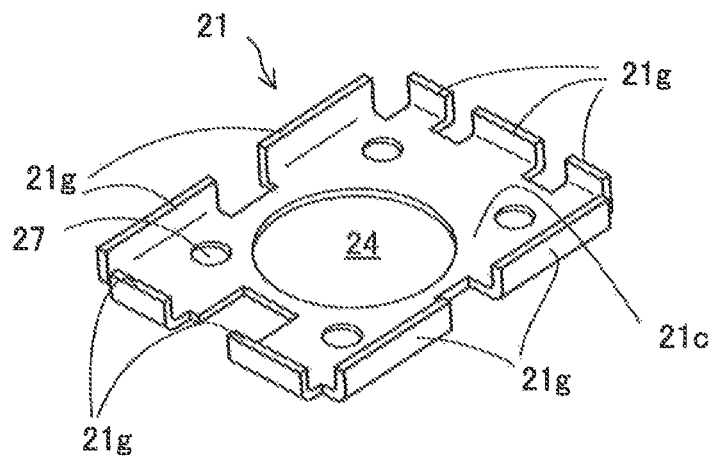
FIG. 4 is a perspective view schematically illustrating a shielding metal plate.
Figure 5:
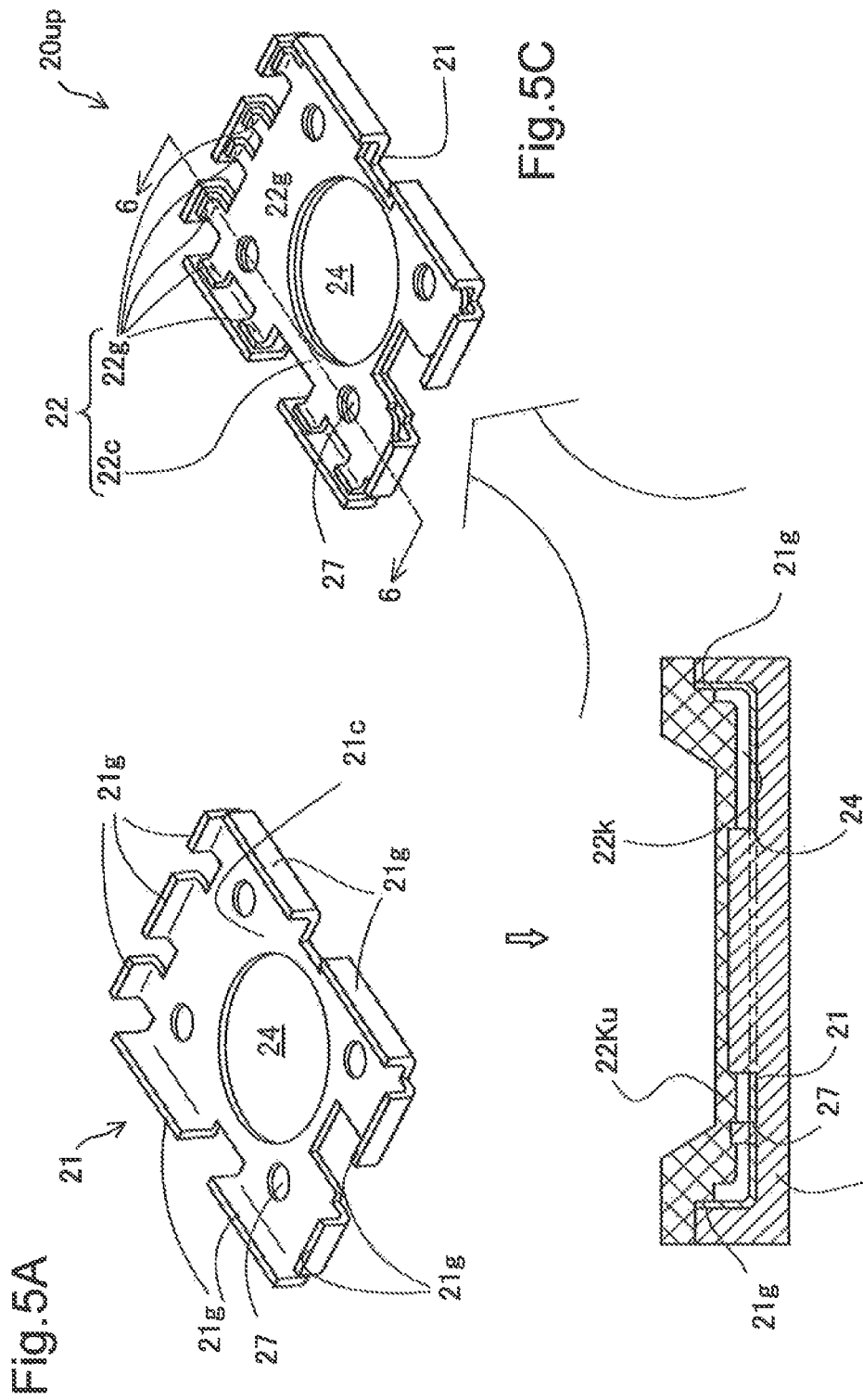
FIGS. 5A to 5C are views illustrating a procedure of manufacturing a pre-housing.
Figure 6:
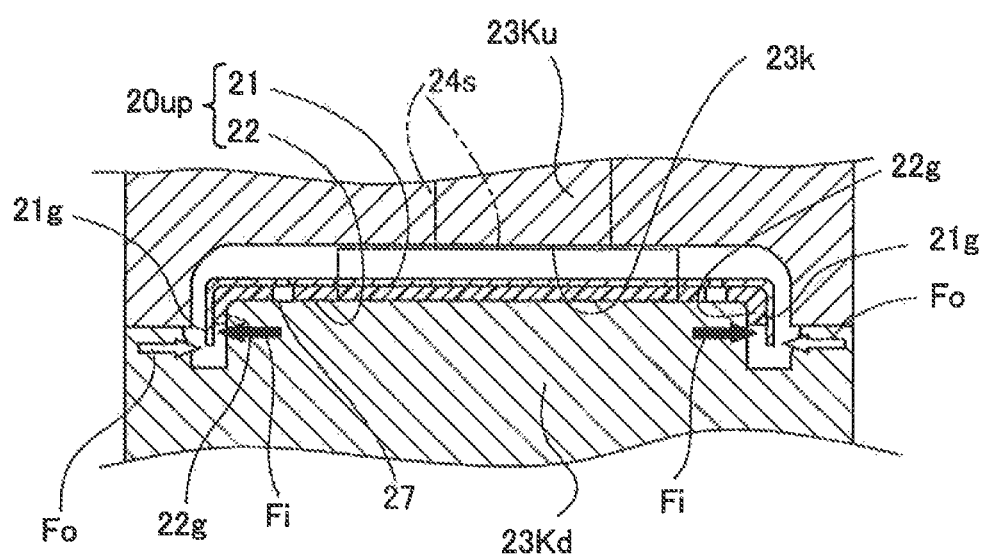
FIG. 6 is a cross-sectional view schematically illustrating a resin injection molding at a time of obtaining an upper housing taken along a line 6-6 in FIG. 5C.

Next, a method of manufacturing the electromagnetic wave shield housing 10 is described. FIG. 3 is a process flowchart illustrating a manufacture procedure of the electromagnetic wave shield housing 10, FIG. 4 is a perspective view schematically illustrating the shielding metal plate 21, FIG. 5 is a view illustrating a procedure of manufacturing a pre-housing 20up, and FIG. 6 is a cross-sectional view schematically illustrating a resin injection molding at a time of obtaining the upper housing 20u.

As illustrated in FIG. 3, the shielding metal plate 21 which constitutes the upper housing 20u is first prepared (process S100). As illustrated in FIG. 4, the shielding metal plate 21 has a plate central area 21c which is a flat plate portion of a substantially rectangular shape, and plate outer peripheral edges 21g at four perimeter outer edges around the plate central area 21c so that the plate outer peripheral edges 21g stand up vertically, at 90 degrees with respect to the plate central area 21c. A plurality of plate outer peripheral edges 21g are provided intermittently (i.e., having a gap between the adjacent plate outer peripheral edges 21g) in the perimeter outer edge of the plate central area 21c in order to reduce the weight. Note that the plate central area 21c may be curved so as to be an upward convex in FIG. 2. In this embodiment, the shielding metal plate 21 of the upper housing 20u has an opening 24 in the plate central area 21c, and the opening 24 communicates with the gas entry protruded portion 28 of FIG. 1 to be used as a gas detection opening for the electronic component EP which is the hydrogen gas detector. A further weight reduction is possible by the size of the opening 24. In addition, the shielding metal plate 21 has four through-holes 27 around the opening 24. At process S100, the shielding metal plate 21 having the shape described above is prepared through a pressing of the thin plate made of metal, such as copper, which is described already. A shielding metal plate which has already been pressed may instead be prepared. The shielding metal plate 21 may also be formed using a punching metal.

Next, the resin plate 22 is formed inside the shielding metal plate 21 to form the pre-housing 20up (process S110). This process is illustrated in FIGS. 5A to 5C. At this process S110, the resin described already is injected after the shielding metal plate 21 (see FIG. 5A) prepared at the preceding process S100 is placed in dies for forming the resin plate. As illustrated in FIG. 5B, the dies are match-up dies comprised of an upper die 22Ku and a lower die 22Kd, and a cavity 22k for forming the resin plate 22 is formed inside the shielding metal plate 21 which has already been placed. As illustrated, the cavity 22k has a first area which occupies inside of the plate central area 21c of the shielding metal plate 21, and second areas which occupy inside of the plate outer peripheral edges 21g which continue from the first area and extend shorter than the periphery ends of the plate outer peripheral edges 21g. The upper die 22Ku and the lower die 22Kd seal so that the injected resin does not fill in the cavity 22k at locations of the opening 24 and the through-holes 27 of the shielding metal plate 21. When the resin is injected into the cavity 22$k$ in such a state, the resin plate 22 is formed inside the shielding metal plate 21.

The shape of the pre-housing 20$up$ after being removed from the dies is illustrated in FIG. 5C. The resin plate 22 of the pre-housing 20$up$ formed in such a way is provided with a plate-shaped central portion 22$c$ which overlaps with the plate central area 21$c$ of the shielding metal plate 21, and stand-up portions 22$g$ extending from outer edge of the central portion 22$c$ with intervals between the adjacent stand-up portions 22$g$. The stand-up portions 22$g$ stand up from the central portion 22$c$ so that their shapes conform to the standing postures of the plate outer peripheral edges 21$g$ of the shielding metal plate 21, and the standing-up height is shorter than the plate outer peripheral edges 21$g$ because of the cavity area shape of the cavity 22$k$ described already. Therefore, as illustrated in FIG. 5C, the stand-up portions 22$g$ overlaps inside of the shielding metal plate 21 with the plate outer peripheral edges 21$g$ of the shielding metal plate 21, respectively. Upper ends of the stand-up portions 22$g$ are shorter than the plate outer peripheral edges 21$g$. When the injected resin is cooled and hardened, and is then removed from the dies, the pre-housing 20$up$, which is an integrated part of the shielding metal plate 21 and the resin plate 22 adhered inside the shielding metal plate 21, is obtained. Note that the resin plate 22 has an opening which overlaps with the opening 24 of the shielding metal plate 21, and through-holes having a large diameter which overlaps with the through-holes 27 of the shielding metal plate 21. The through-holes 27 overlap with the through-holes when the pre-housing 20$up$ is formed, and injected resin as will be described later enters between the shielding metal plate 21 and the resin plate 22 so that the resin holds the overlapping of the shielding metal plate 21 and the resin plate 22.

When the pre-housing 20$up$ is obtained in such a way, a resin injection molding is then performed on the shielding metal plate 21 from outside to form the resin surface portion 23 (process S120). Upon the injection molding, the pre-housing 20$up$ is placed in dies as illustrated in FIG. 6. The dies are match-up dies comprised of an upper die 23Ku and a lower die 23Kd, and a cavity 23$k$ for forming the resin surface portion 23 (see FIG. 2) is formed outside the pre-housing 20$up$, i.e., the shielding metal plate 21 on which the resin plate 22 has been formed inside. In the placed pre-housing 20$up$, a convex portion 24$s$ of the lower die 23Kd enters into the opening 24 (see FIG. 5) which penetrates the shielding metal plate 21 and the resin plate 22.

As illustrated in FIG. 1, the mounting arms 60R and 60L have the bolt bushes 61, and have the shape projected from the lateral (left and right) side walls of the upper housing 20$u$. Thus, the lower die 23Kd and the upper die 23Ku of FIG. 6 for molding the upper housing 20$u$ are provided with arm forming cavity portions for molding the mounting arms 60R and 60L, which extend to the cavity 23$k$ from the locations of the bolt bushes 61. Further, since the connector holder 50 has the shape which projects from the X-direction end of the upper housing 20$u$, the lower the 23Kd and the upper the 23Ku for molding the upper housing 20$u$ also have a cavity portion for forming the connector holder 50, which extends from the cavity 23$k$. In addition, although the lower die 23Kd and the upper die 23Ku for molding the upper housing 20$u$ are also provided with a cavity portion for molding the gas entry protruded portion 28 illustrated in FIG. 1, illustration thereof is omitted because the cavity structures are not directly related to the scope of the present invention.

When the pre-housing 20$up$ is placed in the dies, the resin described already (e.g., acrylic resin) is injected from a resin injection hole (not illustrated) into the cavity 23$k$. After the resin injection into the cavity 23$k$, the resin then fills throughout the cavity 23$k$ to form the resin surface portion 23 which covers the shielding metal plate 21 from outside. The resin surface portion 23 covers the ends of the plate outer peripheral edges 21$g$, thus the resin surface portion 23 covers both front and rear sides of the ends. When the injected resin is cooled and hardened, and is then removed from the dies, the upper housing 20$u$ illustrated in FIG. 2 is obtained. The electronic component EP is mounted onto the upper housing 20$u$, and the upper housing 20$u$ is stacked onto the under housing 20$d$ so as to align their openings, thereby obtaining the housing body 20, and, as the result, obtaining the electromagnetic wave shield housing 10 (process S130). Note that electronic component EP may also be configured to be mounted onto the under housing 20$d$. In such a case, the upper housing 20$u$ is stacked onto the under housing 20$d$ where the electronic component EP has already been mounted so that their openings are aligned. Note that the electronic component EP may be comprised of a plurality of components, and the components are mounted to both the upper housing 20$u$ and the under housing 20$d$.

In the method of manufacturing the electromagnetic wave shield housing 10 of this embodiment described above, the shielding metal plate 21 of the upper housing 20$u$ receives a resin flow pressure Fo resulting from a flow of the resin injected into the cavity 23$k$ during the resin injection. The resin flow pressure Fo acts on the plate central area 21$c$ of the shielding metal plate 21, as well as on the plate outer peripheral edges 21$g$ which stand up from the plate central area 21$c$. The resin flow pressure Fo against the plate outer peripheral edges 21$g$ acts in inward directions from outside the plate (see FIG. 6; indicated by white arrows). Since the stand-up portions 22$g$ of the resin plate 22 attached to the inside of the shielding metal plate 21 overlap with the plate outer peripheral edges 21$g$ of the shielding metal plate 21, the stand-up portions 22$g$ exert a resistance force Fi from inside the plate against the resin flow pressure Fo which acts from outside the plate. Therefore, even when the plate outer peripheral edges 21$g$ which stand up from the plate central area 21$c$ receive the resin flow pressure Fo from outside, the plate outer peripheral edges 21$g$ can maintain their standing postures before the resin injection. In addition, such a preservation of the standing postures of the plate outer peripheral edges 21$g$ is achieved by the lightweight resin plate 22 formed inside the plate, without increasing the thickness of the shielding metal plate 21. As a result, according to the manufacturing method of this embodiment, the standing postures of the plate outer peripheral edges 21$g$ of the shielding metal plate 21 seldom change. In addition, the electromagnetic wave shield housing 10 can be manufactured, without impeding the weight reduction. Further, since the resin plate 22 is only formed inside the shielding metal plate 21 before the resin injection, according to the manufacturing method of this embodiment, the lightweight electromagnetic wave shield housing 10 which does not cause any changes to the standing postures of the plate outer peripheral edges 21$g$ of the shielding metal plate 21 can easily be manufactured.

In this embodiment, upon obtaining the pre-housing 20$up$, the resin plate 22 is formed directly inside the shielding metal plate 21 (see FIG. 5). Therefore, since the resin plate 22 is not necessary to be handled alone, and the resin plate 22 is not necessary to be adhered etc. to the shielding metal plate 21, the process is simple.

The present invention is not limited to the embodiment described above, and can be implemented in various structures without departing from the scope of the invention. For example, technical features in the embodiment corresponding to technical features of each aspect cited in the section of "SUMMARY OF THE INVENTION," can suitably be substituted and/or combined in order to address some or all of the subjects described above, or in order to obtain some or all of the effects described above. The technical features can suitably be deleted if they are not described as essential matters in this specification.

In the embodiment described above, although the resin plate 22 is directly formed inside the shielding metal plate 21, the resin plate 22 may be separately formed from the shielding metal plate 21. FIG. 7 is a view illustrating a procedure of separately preparing the resin plate 22 and manufacturing the pre-housing 20up. As illustrated in parts (A) and (B) of FIG. 7, the resin plate 22 is formed in advance separately from the shielding metal plate 21. As described already, the resin plate 22 has a central portion 22c having a flat plate shape which overlaps with the plate central area 21c of the shielding metal plate 21, and a plurality of stand-up portions 22g in outer edge of the central portion 22c. As illustrated in part (C) of FIG. 7, the resin plate 22 is attached to the inside of the shielding metal plate 21. Upon the attaching, both the resin plate 22 and the shielding metal plate 21 are adhered and fixed to each other with suitable adhesives. Thus, the pre-housing 20up in which the resin plate 22 is incorporated into the inside of the shielding metal plate 21 can be obtained. Then, the upper die 23Ku and the lower die 23Kd are placed as described already, and the resin surface portion 23 is formed.

Alternatively, as for the under housing 20d, it may be comprised of the shielding metal plate 21, the resin plate 22, and the resin surface portion 23, similar to the upper housing 20u.

What is claimed is:

1. A method of manufacturing an electromagnetic wave shield housing that accommodates an electronic component and shields the electronic component from electromagnetic waves, comprising:
a first step of placing a resin plate inside a shielding metal plate, the shielding metal plate including a plate central area of the metal plate having a shielding property against the electromagnetic waves, and plate outer peripheral edges that are formed around the plate central area and stand up from the plate central area in standing postures, the resin plate including a central portion that overlaps with the plate central area, and stand-up portions that stand up from the central portion so as to conform to the standing postures and overlap with the plate outer peripheral edges, respectively; and
a second step of injecting resin to the shielding metal plate, where the resin plate is placed, from outside the shielding metal plate to cover the shielding metal plate with the injected resin from outside,
wherein the injected resin covers a portion of an inner surface of at least one plate outer peripheral edge and does not cover inner surfaces of the stand-up portions,
wherein in the first step, when the resin plate is placed inside the shielding metal plate, the stand-up portions of the resin plate have a height that is lower than a stand-up height of the plate outer peripheral edges of the shielding metal plate that stand up, and
wherein in the second step, the resin injected from the outside of the shielding metal plate goes over the plate outer peripheral edges of the shielding metal plate and gets to an inner side of the shielding metal plate to reach the stand-up portions of the resin plate, so as to cover the shielding metal plate.

2. The method of manufacturing the electromagnetic wave shield housing in accordance with claim 1, wherein the resin plate is formed by injection molding using dies, the resin plate being formed inside the shielding metal plate of which the plate outer peripheral edges are stood up from the plate central area.

3. The method of manufacturing the electromagnetic wave shield housing in accordance with claim 1, wherein the plate outer peripheral edges are formed in the standing postures in which the plate outer peripheral edges are bent and stood up by substantially 90 degrees from the plate central area.

4. A method of manufacturing an electromagnetic wave shield housing that accommodates an electronic component and shields the electronic component from electromagnetic waves, comprising:
placing a resin plate inside a shielding metal plate, the shielding metal plate including a plate central area of the metal plate having an opening therein and a shielding property against the electromagnetic waves, and plate outer peripheral edges that are formed around the plate central area and stand up from the plate central area in standing postures, the resin plate including a central portion that overlaps with the plate central area and which includes an opening that overlaps with the opening of the metal plate, and stand-up portions that stand up from the central portion so as to conform to the standing postures and overlap with the plate outer peripheral edges, respectively; and
injecting resin to the shielding metal plate, where the resin plate is placed, from outside the shielding metal plate,
wherein the injected resin goes over the plate outer peripheral edges of the shielding metal plate and gets to an inner side of the shielding metal plate to reach the stand-up portions of the resin plate to cover the shielding metal plate with the injected resin from outside, and
wherein the injected resin covers a portion of an inner surface of at least one plate outer peripheral edge and does not cover inner surfaces of the stand-up portions.

5. The method of manufacturing the electromagnetic wave shield housing in accordance with claim 4, wherein the resin plate is formed by injection molding using dies, the resin plate being formed inside the shielding metal plate of which the plate outer peripheral edges are stood up from the plate central area.

6. The method of manufacturing the electromagnetic wave shield housing in accordance with claim 4, wherein the plate outer peripheral edges are formed in the standing postures in which the plate outer peripheral edges are bent and stood up by substantially 90 degrees from the plate central area.

7. The method of manufacturing the electromagnetic wave shield housing in accordance with claim 1, wherein a location where the resin injected in the second step meets at least one stand-up portion of the resin plate is situated in a middle portion of a height dimension of the plate outer peripheral edges.

8. The method of manufacturing the electromagnetic wave shield housing in accordance with claim 4, wherein a location where the injected resin meets at least one stand-up portion of the resin plate is situated in a middle portion of a height dimension of the plate outer peripheral edges.

* * * * *